No. 789,679. PATENTED MAY 9, 1905.
J. TURNBULL.
CHUCK OR TOOL HOLDER FOR ROCK DRILLS OR OTHER MACHINES.
APPLICATION FILED NOV. 16, 1904.
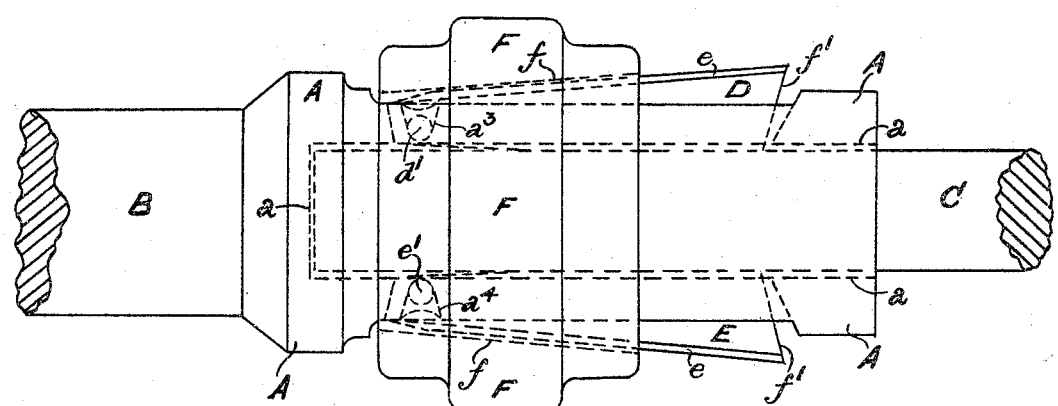

No. 789,679.

Patented May 9, 1905.

UNITED STATES PATENT OFFICE.

JOHN TURNBULL, OF JOHANNESBURG, TRANSVAAL.

CHUCK OR TOOL-HOLDER FOR ROCK-DRILLS OR OTHER MACHINES.

SPECIFICATION forming part of Letters Patent No. 789,679, dated May 9, 1905.

Application filed November 16, 1904. Serial No. 232,989.

*To all whom it may concern:*

Be it known that I, JOHN TURNBULL, a subject of the King of England, residing at Johannesburg, Transvaal, have invented certain new and useful Improvements in Chucks or Tool-Holders for Rock-Drills or other Machines, of which the following is a specification.

This invention has reference to a chuck or drill-holding device primarily designed for rock-drills or rock-drilling machines, although it may be used as a tool-holder for other classes of drilling-machines.

The objects with which the present improvements are designed are, first, to provide an efficient chuck of simple and cheap construction in which the wearing parts may be readily removed and renewed at small expense; secondly, to dispense with the use of springs or the like for operating the gripping-pieces; thirdly, to provide a chuck in which the drill or tool will be centered or always maintained in axial alinement with the axis of the chuck; fourthly, to dispense with the ordinary chuck-bolts of U shape and the pads and bush, the breakage of all of which is of frequent occurrence and which are costly to replace, and, fifthly, so that the impact of the drill or bit in the running of the machine tends to tighten the grip and prevents the drill or tool being displaced in the operation of the machine.

I will now proceed to describe my invention in detail by aid of the accompanying sheet of drawings, wherein I illustrate a chuck embodying the improvements, and in which—

Figure 1 is a side elevation. Fig. 2 is an end elevation. Fig. 3 is a longitudinal sectional elevation. Fig. 4 is a longitudinal side elevation of one of the pawls or gripping-pieces detached and drawn to an enlarged scale, and Fig. 5 is an end elevation of Fig. 4.

The head or body of the chuck is represented at A. It may, as illustrated, be fashioned in one piece with and on the outer extremity of the piston-rod B or other equivalent member of the percussive rock-drill or other machine. In the drawings I show the head or body A of cylindrical form; but it may be of any suitable configuration. The head or body A is bored out axially, as is indicated at $a$, to receive the shank of the drill or other tool C. The bore $a$ of the head A may be cylindrical and the shank of the drill or tool C be shaped to correspond, or the bore $a$ may be made hexagonal to receive the ordinary hexagonal section of drill-steel or of any other desired section.

In the head or body A and preferably diametrically opposite each other are formed two longitudinal slots $a'$ $a^2$, which communicate with the bore $a$. In the slots $a'$ $a^2$ are located two pawls or gripping-pieces D E. (Shown in detail in Figs. 4 and 5.) The pawls or gripping-pieces D E are, as illustrated, tapered from the back to the front of the head A. Their inner faces $d$, which project through the slots $a'$ $a^2$ into the bore $a$, are curved, as shown in Fig. 5, to fit or embrace the shank of the drill steel or tool C when the latter is projected into the bore $a$. The inner faces $d$ are made parallel for a portion of their length or from, say, the point 1 to the point 2, and they are beveled off in the reverse direction from the point 1 to the point 3. The backs or outer faces $e$ of the pawls or gripping-pieces D E are inclined or tapered in relation to the inner parallel faces $d$ from the point 4 to the point 5, and in the reverse direction they are beveled inward from the point 4 to the point 6. The inner faces $d$ are beveled off, as shown, from the point 1 to the point 3 to allow the gripping-pieces D E to expand or move outward in the operation of inserting the shank of the drill or tool C, and they are beveled off on the back or upper faces $e$, as indicated, from the point 4 to the point 6 to allow them to move inward to grip the shank of the drill or tool C.

In the sides and at the rear ends of the longitudinal slots $a'$ $a^2$ are formed recesses $a^3$ $a^4$, and in the ends of the two pawls or gripping-pieces D E are arranged pins $d'$ $e'$, which fit into said grooves or recesses $a^3$ $a^4$ and form pivots about which the pawls or gripping-pieces D E are free to move. The pawls or gripping-pieces D E, being free to move inward into the bore $a$ of the head A on the pins or pivots $d'$ $e'$, grip the shank of the drill or tool C along their inner paralled edges or faces $d$.

Encircling the head A and the two pawls or gripping-pieces D E is a sleeve F, which is formed with a tapered or conical bore $f$, corresponding to the taper on the backs or outer faces $e$ of the pawls or gripping-pieces D E. The backs or outer faces $e$ of the pawls or gripping-pieces D E are curved to correspond to the outside of the head A, so that by moving the sleeve F forward it operates to force the pawls or gripping-pieces D E inward to grip the shank of the drill or tool C and when moved in a rearward direction releases the pawls D E, so that the latter release their grip of the shank of the bit or tool C and allow it to be withdrawn.

With the object of preventing the pawls or gripping-pieces D E dropping into the bore $a$ of the chuck A when the drill or tool C is withdrawn their forward extremities are beveled off, as shown at $f'$ in Fig. 5, and the front ends of the slots $a'$ $a^2$ (see Figs. 1 and 3) are also beveled off in the same direction, thereby rendering it impossible for the pawls D E to drop into the bore $a$ beyond a certain point.

Instead of employing two of the pawls D E, as illustrated and described, it will be evident that one or three or more may be used, as may be preferred.

The working of the chuck may be described as follows: To detach the drill bit or tool C, the sleeve F is moved in a rearward direction, which releases the pawls or gripping-pieces D E and allows the drill or tool C to be withdrawn. The shank of the new drill or tool C is then projected into the bore $a$ and between the gripping-pieces D E, which are supported or prevented entering the bore $a$ beyond a certain point by their beveled forward extremities $f'$ and the beveled forward ends of the longitudinal slots $a'$ $a^2$. The act of inserting the drill or tool expands the pawls or gripping-pieces D E, and after the shank of the drill or tool has been projected to the bottom of the bore $a$ the sleeve F is then moved forward and by forcing the pawls or gripping-pieces D E into the bore $a$ causes the drill or tool to be secured.

What I claim as my invention, and desire to protect by Letters Patent, is—

In a chuck for rock-drills or rock-drilling machines, in combination, the body or head A formed with the axial bore $a$ and the longitudinal slots $a'$ $a^2$ communicating with the bore $a$, and with the recesses $a^3$ $a^4$ in the sides of the slots $a'$ $a^2$, the shank C of the bit or tool projected into the bore $a$, the pawls D E made parallel along the face $d$ from the point 1 to the point 2 and shaped to embrace the shank of the bit or tool and tapered away from said shank from the point 1 to the point 3 or in the direction of the pivot, and inclined or beveled along the outer face $e$ from the point 4 to the point 5 and then inclined more acutely toward the pivot or from the point 4 to the point 6, said pawls being wider at their outer ends between the points 2 and 5 and narrower between the points 3 and 6, the pivots $d'$ $e'$ fitted in the ends of the pawls D E and located in the recesses $a^3$ $a^4$, the sleeve F encircling the head and pawls D E said sleeve F being formed with a conical bore corresponding to the taper on the outside of the pawls D E so that when the sleeve is moved toward the point of the bit it forces the pawls inward to grip the shank of the drill and when moved in the reverse direction allows the drill to be withdrawn from the chuck, substantially as described.

In witness whereof I have hereunto set my hand in the presence of two subscribing witnesses.

JOHN TURNBULL.

Witnesses:
    CHAS. OVENDALE,
    R. OVENDALE.